(12) United States Patent
Wu

(10) Patent No.: US 8,185,116 B2
(45) Date of Patent: May 22, 2012

(54) METHODS AND SYSTEM FOR HANDLING PROXIMITY INDICATION AND DETECTION IN A WIRELESS COMMUNICATION SYSTEM

(75) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 13/019,660

(22) Filed: Feb. 2, 2011

(65) Prior Publication Data
US 2011/0195715 A1 Aug. 11, 2011

Related U.S. Application Data

(60) Provisional application No. 61/302,972, filed on Feb. 10, 2010, provisional application No. 61/303,671, filed on Feb. 11, 2010.

(51) Int. Cl.
*H04W 36/00* (2009.01)
(52) U.S. Cl. .................... 455/436; 455/456.1
(58) Field of Classification Search .... 455/456.1–456.6, 455/436–444
See application file for complete search history.

(56) References Cited

U.S. PATENT DOCUMENTS

| | | |
|---|---|---|
| 2009/0201871 A1 | 8/2009 | Sambhwani et al. |
| 2010/0041429 A1 | 2/2010 | Sidi et al. |
| 2010/0061356 A1 | 3/2010 | Qvarfordt |
| 2010/0165960 A1 | 7/2010 | Richardson |
| 2010/0323633 A1* | 12/2010 | Pani et al. ................. 455/67.14 |

OTHER PUBLICATIONS

Universal Mobile Telecommunications System (UMTS); Radio Resource Control (RRC); Protocol specification, 3GPP TS 25.331 version 9.1.0 Release 9, Available Jan. 18, 2010, http://www.3gpp.org/ftp/specs/html-info/25331.htm.*

Tikamdas, et al., Direction-based Proximity Detection Algorithm for Location-based Services, IFIP International Conference on Wireless and Optical Communications Networks, 2009 (WOCN '09), Apr. 28, 2009, p. 1.

Ghosh, et al., Overview of Enhanced Uplink for 3GPP W-CDMA, IEEE 59th Vehicular Technology Conference, 2004 (VTC 2004—Spring), vol. 4, May 15, 2004, p. 2261.

Skoutas, et al., Efficient Selection of OVSF codes for Downlink DCH in WDCMA, IEEE 59th Vehicular Technology Conference, 2004 (VTC 2004—Spring) May 17, 2004, p. 1954.

Nokia Siemens Networks, Nokia Corporation; "Reporting of HNB System Information;" R2-100546; 3rd Generation Partnership Project (3GPP) 3GPP TSG-RAN WG2 Meeting #68bis; Jan. 18-22, 2010; pp. 1-4.

HTC Corporation; "Change Request: Clarification on proximity indication reporting in CELL_FACH, CELL_PCH and URA_PCH;" R2-101172; 3rd Generation Partnership Project (3GPP) 3GPP TSG-RAN2 Meeting #69; Feb. 22-26, 2010; pp. 1-4.

* cited by examiner

*Primary Examiner* — Steven Lim
(74) *Attorney, Agent, or Firm* — Perkins Coie LLP

(57) ABSTRACT

A method and system to configure proximity detection and reporting in a wireless device during a transition of the wireless device from one cell state to another cell state in a third generation (3G) wireless communication system. In a first cell state, the wireless device is configured for proximity indication. The wireless device is transitioned from using the first cell state to using a second cell state. Upon the transition from the first cell state, the wireless device receives information from a base transceiver to reconfigure the proximity indication configuration based on the second cell state. The reconfiguration allows the mobile device to retain the existing proximity indication configuration, remove the proximity indication configuration, or stop reporting proximity indication. Additionally, the base transceiver also adjusts proximity configuration stored at the base station based on the second cell state.

15 Claims, 6 Drawing Sheets

METHODS AND SYSTEM FOR HANDLING PROXIMITY INDICATION AND DETECTION IN A WIRELESS COMMUNICATION SYSTEM

CROSS-REFERENCE TO RELATED APPLICATION(S)

This application is related and claims priority to Provisional Application No. 61/302,972, filed Feb. 10, 2010 and Provisional Application No. 61/303,671, filed Feb. 11, 2010, each of which are hereby incorporated by reference.

BACKGROUND

Universal Mobile Telecommunications System (UMTS) is one of the third generation (3G) mobile telecommunications technologies and is also being developed into a 4G technology. UMTS terrestrial radio access network (UTRAN) is a collective term for a core network including base stations, known as Node Bs, and base station controllers, known as radio network controllers (RNCs), which make up a UMTS radio access network. A UTRAN can carry many traffic types, from real-time circuit-switched traffic to IP-based packet-switched traffic. A UTRAN allows connectivity between user equipment (UE) and the core network. The RNC provides control functionalities for one or more Node Bs. A Node B and an RNC may be combined in a single device, although typical implementations have a separate RNC located in a central office serving multiple Node Bs.

Recently the evolution of mobile access points within the mobile telecommunication industry has introduced femtocells into wireless communication systems. A femtocell is a small cellular base station, typically designed for use in a home or small business. Femtocells generally connect to the service provider's network via a customer's broadband connection, such as a Digital Subscriber Line (DSL) or cable broadband connection. A femtocell allows service providers to extend service coverage indoors, especially where access would otherwise be limited or unavailable. In 3G terms, femtocells are called Home Node Bs (HNBs).

HNBs are often arranged in uncoordinated large-scale deployments of several HNBs, and therefore the connection to the operator's core network needs to be realized efficiently. A closed subscriber group (CSG) is a specific group of UEs permitted access to a HNB. A CSG identifier (CSG-ID) is broadcast from the HNB in a system information block message (SIB), and only those UEs that are members of this group, as defined by a CSG whitelist of CSG IDs (generally stored on the UE), will attempt to select the cell.

Before deciding to hand over a UE to a HNB, a UTRAN generally needs to acquire UE measurement information related to the target HNB cell. The UTRAN can control what measurements the UE performs. In order to allow the UE to make those measurements efficiently, proximity detection can be configured within the UE via a radio resource control (RRC) measurement control message issued by the UTRAN. One type of measurement sent to a UE contains "CSG proximity detection" information, which is used by the UE to enable a proximity detection function to enter or leave one or more HNB cells within the UE's CSG whitelist. HNBs detected by the UE can be reported by the UE to the UTRAN via a proximity report in a measurement report message.

The 3rd Generation Partnership Project (3GPP) specifications define four RRC states in the connected mode: CELL_DCH, CELL_FACH, CELL_PCH, and URA_PCH. These states reflect the level of UE connection and the transport channels that can be used by the UE. For example, the CELL_FACH state, CELL_PCH state and URA_PCH state are characterized by the fact that there is no dedicated transport channel. In contrast, a UE in the CELL_DCH state has an assigned dedicated transport channel. A dedicated transport channel is not allocated in CELL_FACH, where a default common or shared transport channel is assigned. The descriptions for RRC layers are detailed in specification "3GPP TS 25.331 Radio Resource Control (RRC)" and hence are not repeated in detail.

SUMMARY

Current 3GPP specifications indicate that the UTRAN configures proximity detection in a UE by using the CELL_DCH state. While in the CELL_DCH state, the UE receives messages from the UTRAN instructing the UE as to what to measure, when to measure it, and how to report the measurement results. However, when the UE moves from CELL_DCH to CELL_FACH, CELL_PCH, or URA_PCH, there is no standard within current 3GPP specifications to instruct the UE when, where, and how to perform proximity detection and/or report proximity indication to the UTRAN. This creates inefficiencies resulting in decreased battery life of the UE, potential loss of transmitted data, degraded radio resource utilization, and erroneous configurations stored by the UTRAN and/or UE.

Introduced herein are methods and a system for configuring a UE for handling proximity indication and proximity detection in a wireless communication system.

In one embodiment, a UE configured with proximity detection stops reporting proximity indication to the UTRAN when the UE transitions from the CELL_DCH state to one of the CELL_FACH, CELL_PCH or URA_PCH states. Upon stopping the proximity indication reports, the UE stops performing proximity detection.

In some embodiments, a UE configured with proximity detection invalidates or deletes proximity detection configuration stored at a memory of the UE when the UE transitions from the CELL_DCH state to one of the CELL_FACH, CELL_PCH, or URA_PCH states. Upon invalidating or deleting the proximity detection configuration, the UE stops performing proximity detection. Additionally, the UTRAN can invalidate or delete proximity detection information stored by the UTRAN.

In a further embodiment, a UE configured for proximity detection retains proximity detection configuration information stored at a memory of the UE when the UE transitions from the CELL_DCH state to one of the CELL_FACH, CELL_PCH, or URA_PCH states. Upon retaining the proximity detection configuration information, the UE continues to perform proximity detection and to send proximity indication reports, based on the retained proximity detection configuration information. Additionally, the UTRAN retains proximity detection information used to configure the proximity detection at the UE.

In yet another embodiment, a UE configured for proximity detection retains proximity detection configuration information stored at a memory of the UE when the UE transitions from one of the CELL_FACH, CELL_PCH, or URA_PCH states to CELL_DCH. Upon retaining proximity detection, the UE continues to perform proximity detection and to send proximity indication reports, based on the retained proximity detection configuration information.

The solutions presented herein overcome the limitations of prior art, which defines configuring proximity indication in a UE by using CELL_DCH to establish procedural control to configure the UE to detect and to report proximity indication.

BRIEF DESCRIPTION OF THE DRAWINGS

One or more embodiments of the disclosed method/apparatus are illustrated by way of example and not limitation in the figures of the accompanying drawings, in which like references indicate similar elements.

DETAILED DESCRIPTION

References in this specification to "an embodiment," "one embodiment," or the like mean that the particular feature, structure, or characteristic being described is included in at least one embodiment of the disclosed system. Occurrences of such phrases in this specification do not necessarily all refer to the same embodiment.

Current implementations of 3G wireless communication systems configure proximity detection in a UE using only one of the four connected mode RRC cell states, CELL_DCH. A UE operating in, or transitioned to, CELL_FACH, CELL_PCH, or URA_PCH has no procedure within current 3GPP specifications to enable, disable, or otherwise configure proximity detection. Similarly, the UTRAN used to configure, via CELL_DCH, proximity indication at the UE lacks a standard operating procedure when the UE transitions to CELL_FACH, CELL_PCH, or URA_PCH.

Figure 1:
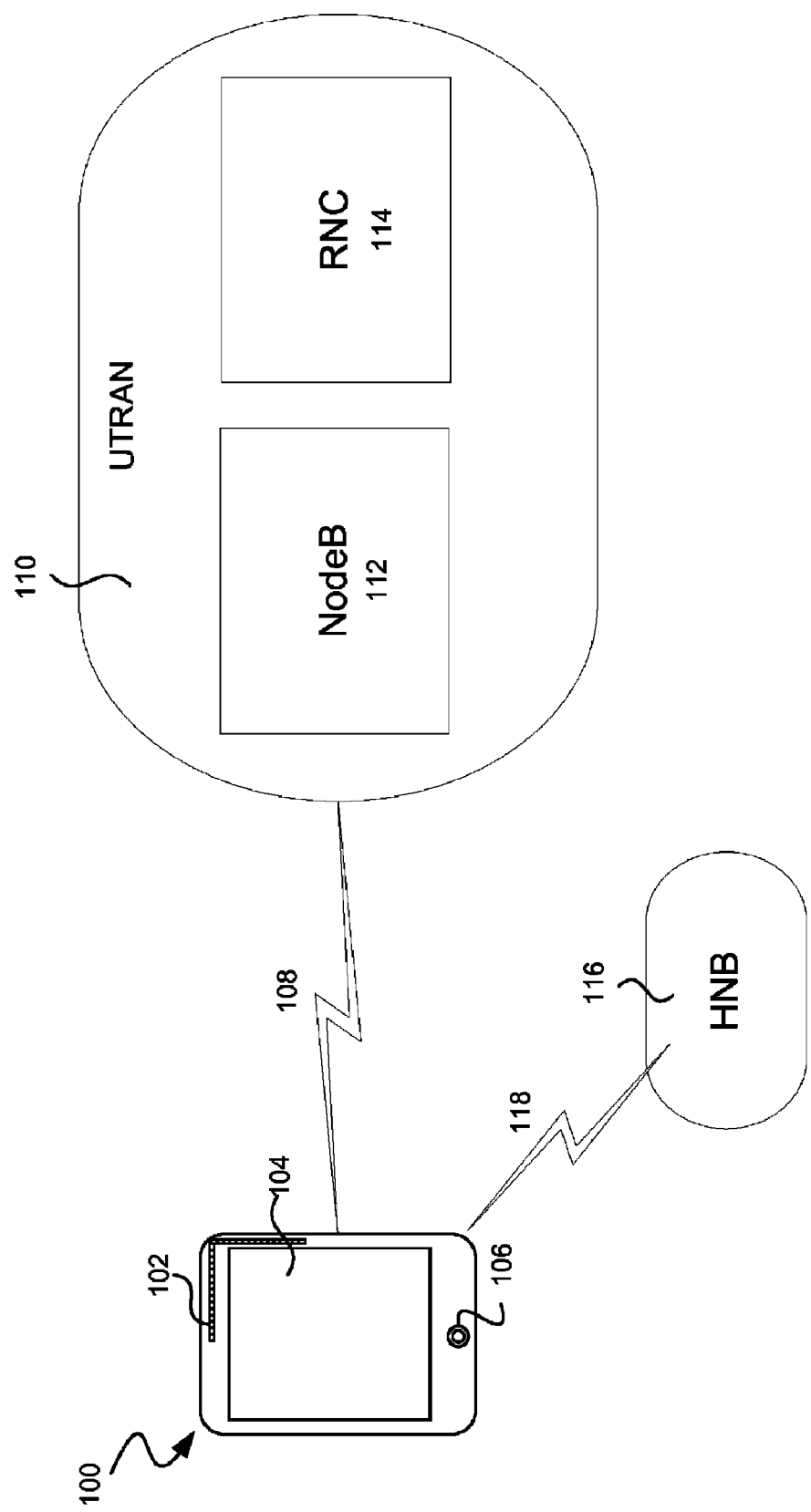
FIG. 1 illustrates a wireless communications system having a UTRAN, UE, and HNB.

FIG. 1 shows a wireless communications system having a UTRAN 110, a UE 100, and an HNB 116 in which the techniques introduced here can be implemented. It is noted that the UE described here is an illustration of one type of a wireless device in which the techniques can be implemented and that other wireless devices can be used for implementing the techniques. For example, UEs may include a cell phone, a personal digital assistant (PDA), a portable email device (e.g., a Blackberry® device), a portable media player (e.g., an Apple iPod Touch®), a tablet or slate computer (e.g., an Apple iPad®), a netbook computer, a notebook computer, an e-reader, or any other device having wireless communication capability.

The UE 100 includes a display 104 used to make and to receive telephone calls and to display data services. In some embodiments, the display 104 is a touch screen that allows for the direct manipulation of displayed data. The UE 100 has a multifunction input module 106 to operate the UE 100, navigate the display, and perform selections on data. The input module 106 can be, for example, a keyboard, mouse, trackball, touch screen, or any other input module capable of communicating a user selection. Additionally, the UE 100 operates an antenna system 102 to send and receive information via wireless networks.

The UTRAN 110 is a wireless communication network used to communicate to the UE 100. The UTRAN 110 contains one or more base transceiver stations (or "Node Bs" in 3G networks) 112 to communicate to other base transceivers (not shown) and other network core components within the UTRAN 110, such as a base station controller or RNC 114. The core components 112 and 114 of the UTRAN 110 can communicate to the UE 100 via an air interface 108, such as the wideband code division multiple access (WCDMA) air interface defined within the 3GPP specifications. The air interface 108 is used to handle control plane signaling between the UE 100 and the UTRAN 110 by using RRC messages to control various functions in the UE 100, such as connection establishment, measurements, radio bearer services, security, and handover decisions.

The Home Node B (HNB) 116 is a femtocell. HNBs 116 may broadcast IDs via a radio frequency 118 that are discoverable by a UE 100 that is configured for proximity detection. The UE 100 detects proximity using an autonomous search function. Network-controlled handover functionality is typically required for a UE 100 in an RRC connected state within the UTRAN 110. Before making a decision to handover to a HNB 116, the RNC 114 needs to acquire UE measurement information related to the HNB 116. A UE 100 that is able to determine that it is proximate to a HNB 116 can inform the RNC 114 by sending a measurement report message containing proximity indication. The RNC 114 and the UE 100 use RRC configuration protocols to communicate the proximity indication.

Figure 2:
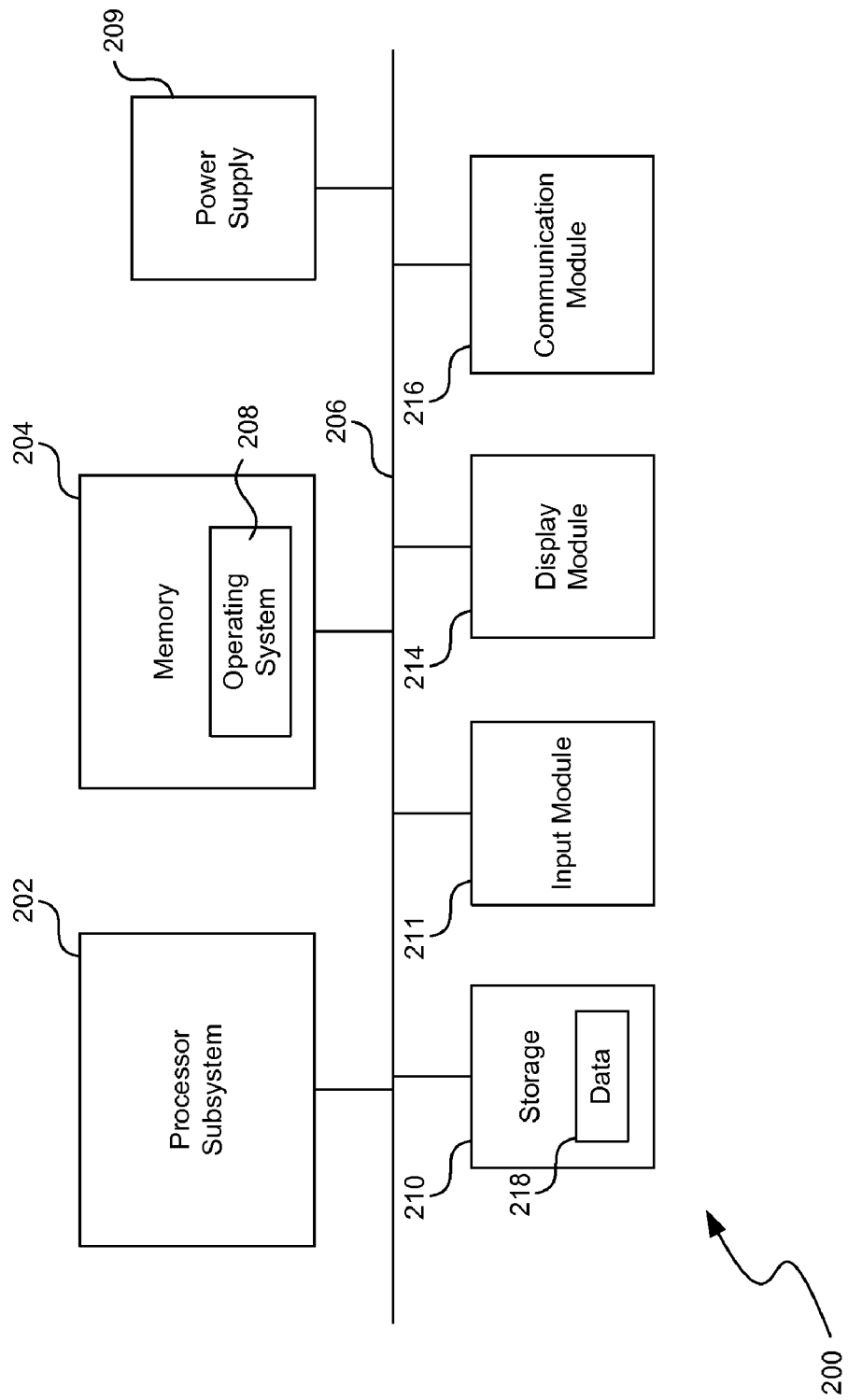
FIG. 2 is a high-level block diagram showing an example of the hardware architecture of a UE.

FIG. 2 is a block diagram of one embodiment of the internal structure of the UE 100 that can implement one or more features of the disclosed system. In the illustrated embodiment, the UE architecture 200 is a computer system that includes a processor subsystem 202, which further includes one or more processors. The UE architecture 200 further includes a memory 204 containing an operating system 208, a storage module 210 containing data 218, an input module 211, a display module 214, and a communication module 216, each interconnected by an interconnect 206 and powered by a power supply 209.

The UE architecture 200 can be embodied as a single- or multi-processor system that preferably implements a high-level module to receive the data 218 from the UTRAN 110. The received data 218 is communicated via the communication module 216, which includes a single or multiple antenna system capable of receiving and transmitting the data 218 using one or more frequencies. The data 218 can be stored in the storage module 210 for retrieval by the processor subsystem 202 and memory 204. The processor subsystem 202 is configured by the data 218 to perform the features of the system, such as configuring proximity detection and transmitting indication reports.

For example, and as further explained below, upon the receipt of an RRC message containing proximity detection configuration information from the RNC 114, the communication module 216, in conjunction with the processor subsystem 202, relays the message to the storage module 210 via the interconnect 206. Based on the proximity detection configuration information contained in the message, the processor subsystem 202 is configured based on the data 218 of the message to enable/disable proximity detection of CSG cells, such as the HNB 116, and/or report the proximity indication to the UTRAN 110.

The display module 214 is configured to connect to the display 104 (FIG. 1) for illustrating information to view on the display 104. Information for display can consist of textual, graphical, and/or multimedia information and is presentable in a graphical user interface. In some embodiments, the display 104 includes a touch-sensitive component that allows for the direct manipulation of displayed information. The displayed information is additionally manipulable by the input module 106.

The input module 211 is configured to receive the data 218 from a signal originating from the input module 106. The signal may include a user selection transmitted to the input module 211, which conveys via the interconnect 206 the signal to the processor subsystem 202 and the operating system 208.

The memory 204 illustratively comprises storage locations that are addressable by the processor subsystem 202 and components 209, 210, 211, 214, and 216 for storing software program code and data structures associated with the present system. The processor subsystem 202 and components may, in turn, comprise processing elements and/or logic circuitry configured to execute the software code and manipulate the data structures. The operating system 208, portions of which are typically resident in the memory 204 and executed by the processor subsystem 202, functionally organizes the UE architecture 200 by (among other things) configuring the processor subsystem 202 to invoke cell state selection and proximity indication related operations in support of the disclosed method/apparatus. It will be apparent to those skilled in the art that other processing and memory implementations, including various computer readable storage media, may be used for storing and executing program instructions pertaining to the technique introduced here.

One skilled in the art will appreciate that a similar structure may be used to operate the HNB 116 and Node B 112. For example, the internal architecture of Node B 112 includes a communication module 216, processor subsystem 202, memory 204, and storage module 210, each configured to communicate via an interconnect 206.

One skilled in the art will also appreciate that some or all of the disclosed method can be implemented using software stored on a computer-readable medium 204 and executed by a processor 202.

Figure 3A:
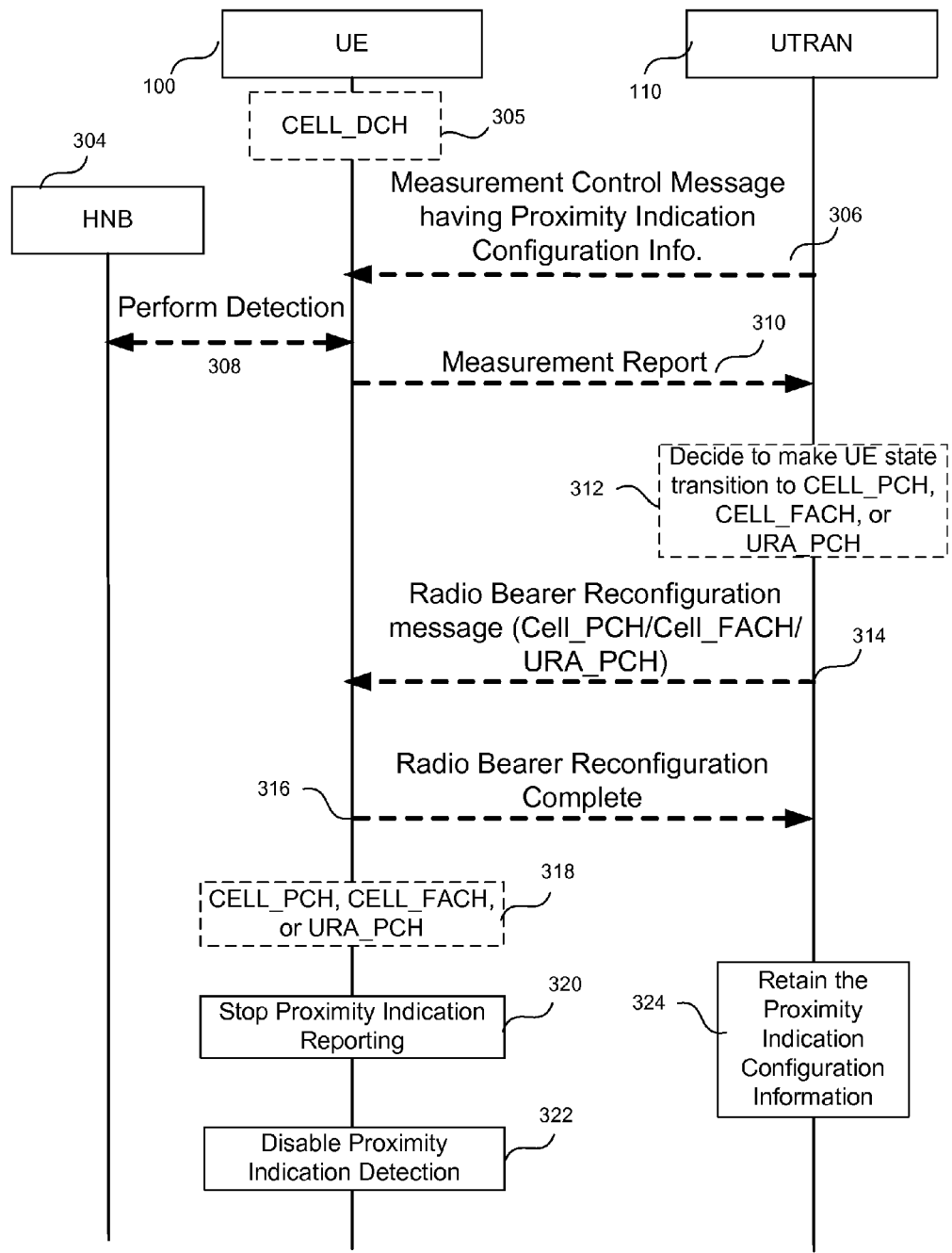
FIG. 3A is a timing diagram of an example communication between a UTRAN and a UE where proximity indication reporting is stopped when the UE transitions from using CELL_DCH to CELL_FACH, CELL_PCH, or URA_PCH.

FIG. 3A is a timing diagram of an example communication between a UTRAN and a UE where proximity indication reporting is stopped when the UE transitions from using CELL_DCH to CELL_FACH, CELL_PCH, or URA_PCH. Initially, the UE 100 is configured to use the RRC CELL_DCH state at step 305. At step 306, the UTRAN 110 sends proximity indication configuration information via a measurement control message to enable the UE 100 to detect proximity of CSG cells, such as a HNB 304. The purpose of the measurement control message at step 306 is to set up, modify, or release a measurement in the UE 100. Upon reception of the measurement control message at step 306, the UE 100 performs actions based on the contents of the message. If the message directed the UE 100 to enable proximity detection, it performs detection at step 308 on the HNB 304. For example, the UE 100 may perform CSG proximity detection to detect the proximity of the UE 100 to one or more HNBs 304 broadcasting a CSG identity within the UE's CSG whitelist. The UE 100 then sends the results of the detection at step 308 to the UTRAN 110 as a measurement report at step 310. In addition to the results of the detection, the measurement report at step 310 may include results of other measurements, such as intra-frequency measurement or traffic volume measurement, configured by the UTRAN.

In step 312, the UTRAN 110 makes the decision to transition the UE from the CELL_DCH state to a different RRC connected state, such as CELL_PCH, CELL_FACH, or URA_PCH. The decision 312 may be based on a list of events including activity of data transmission from/to the UE monitored by the UTRAN, or the receipt of the measurement report at step 310. The UTRAN 110 initiates the radio reconfiguration procedure to transition the UE from CELL_DCH by sending a radio bearer reconfiguration message at step 314. The UE 100 responds with a radio bearer reconfiguration complete message at step 316. After receiving an acknowledgement message from the UTRAN 110, the UE 100 enters a new RRC connected state (CELL_PCH, CELL_FACH, or URA_PCH) at step 318 depending on the state specified in the radio bearer reconfiguration message at step 314. Upon transitioning from CELL_DCH to the new state at step 318, the UE 100 may also stop sending proximity indication reports at step 320 and the UE 100 may stop performing proximity detection at step 322. The UE 100 and UTRAN 110 may retain the proximity indication configuration information 324 previously used to configure the UE 100 at step 306. The UE 100 can optionally (not shown) resume performing proximity detection after the transition from CELL_DCH. The UTRAN 110 may initiate (not shown) a similar radio reconfiguration procedure to transition the UE from the new state to CELL_DCH by sending a radio bearer reconfiguration message. The UE 100 responds with a radio bearer reconfiguration complete message. The UE 100 enters a new RRC connected state (CELL_DCH). Upon transitioning from the new state to CELL_DCH, the UE 100 may also resume sending proximity indication reporting. Additionally the UE may enable the proximity detection if the UE disables the proximity detection from CELL_DCH to the new state at step 338 of FIG. 3A.

In another embodiment (not shown), when the UE 100 transitions from CELL_FACH to CELL_PCH or URA_PCH, the UE 100 may stop sending proximity indication reports and the UE 100 may disable proximity detection. The UTRAN 110 may retain the proximity indication configuration information 324 previously used to configure the UE 100.

Figure 3B:
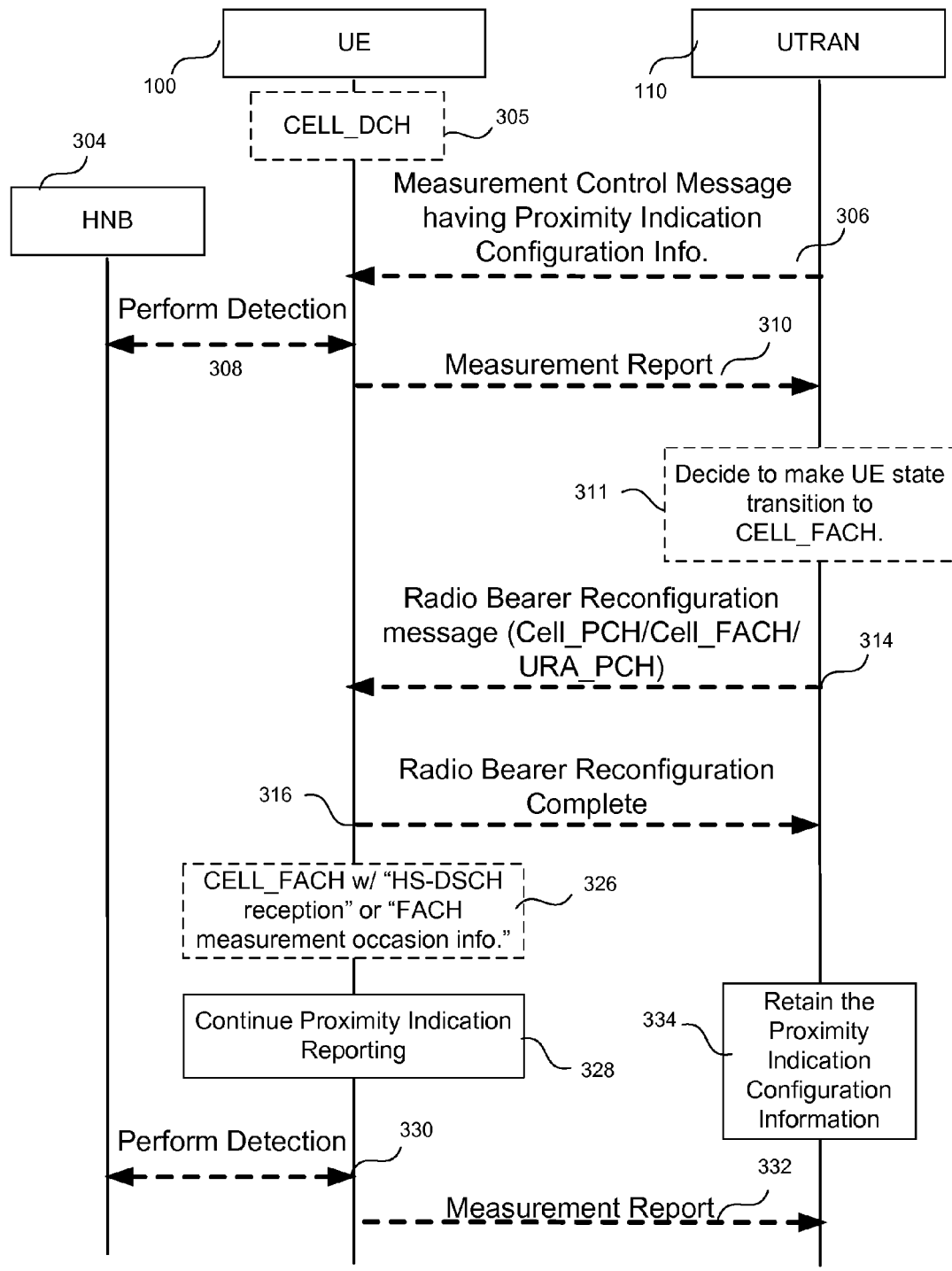
FIG. 3B is a timing diagram of an example communication between a UTRAN and a UE where proximity indication reporting is retained when the UE transitions from using CELL_DCH to CELL_FACH, CELL_PCH, or URA_PCH.

FIG. 3B is a timing diagram of an example communication between a UTRAN and a UE where proximity indication reporting is retained when the UE transitions from using CELL_DCH to CELL_FACH, CELL_PCH, or URA_PCH. Steps 305-316 are similar to steps 305-316 of FIG. 3A. However, the UTRAN 110 decides to transition the UE 100 to CELL_FACH at step 311. Upon transitioning from CELL_DCH to CELL_FACH, the UE 100 can determine whether it is configured for CELL_FACH measurement occasion information or high speed downlink shared channel (HS-DSCH) discontinuous (DRX) reception, at step 326.

CELL_FACH measurement occasion information and HS-DSCH DRX reception in a CELL_FACH state define the times when the UTRAN 110 halts downlink transmissions to the UE 100 in the CELL_FACH state to allow the UE 100 to make measurements on other cells, such as the HNB 304. Both CELL_FACH measurement occasion information and HS-DSCH DRX reception are configured by the UTRAN 110 using system information broadcasts sent to the UE 100.

Upon transitioning the UE 100 from CELL_DCH to CELL_FACH and determining that the UE 100 is configured for CELL_FACH measurement occasion information or HS-DSCH DRX reception at step 326, the UE 100 may continue to report proximity indication at step 328 by performing detection at step 330 and sending measurement reports at step 332 to the UTRAN 110. The UTRAN 110 may retain the proximity indication configuration information previously used to configure the UE 100 at step 306.

Figure 3C:
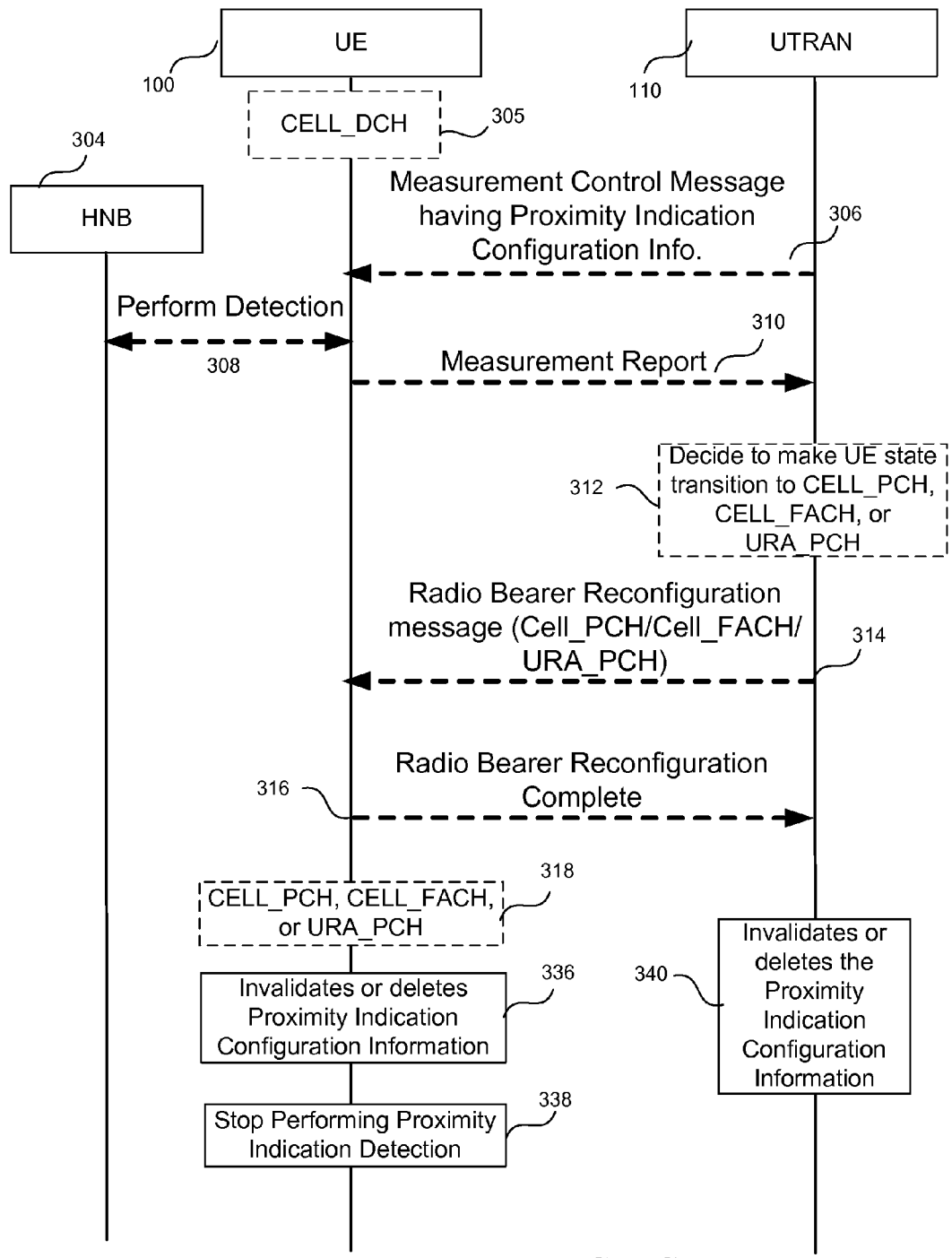
FIG. 3C is a timing diagram of an example of communication between a UTRAN and a UE where proximity indication reporting is invalidated or deleted when the UE transitions from using CELL_DCH to CELL_FACH, CELL_PCH, and URA_PCH.

FIG. 3C is a timing diagram of an example of communication between a UTRAN and a UE where proximity indication reporting is invalidated or deleted when the UE transitions from using CELL_DCH to CELL_FACH, CELL_PCH, and URA_PCH. Steps 305-318 are similar to steps 305-318 of FIG. 3A. However, upon transitioning from CELL_DCH to the new state at step 318, the UE may invalidate or delete proximity indication configuration information at step 336 and stop performing proximity detection at step 338. The UTRAN 110 may also invalidate or delete at step 340 the proximity indication configuration information previously used to configure the UE 100 at step 306. If the UTRAN 110 needs the UE to perform proximity reporting, the UTRAN 110 needs to send a second measurement control to configure the UE CSG proximity detection again.

An invalidation or deletion may be performed in any manner known in the art. For example, an invalidation may consist of an indication, such as a pointer, reference, or data flag, signaling that a current configuration of the UE 100 and/or the UTRAN 110 not be used. A deletion may be a removal of all or a portion of stored proximity indication configuration information stored at the UE 100 and/or the UTRAN 110.

In another embodiment (not shown), when the UE 100 transitions from CELL_FACH to CELL_PCH or URA_PCH, the UE may invalidate or delete proximity indication configuration information and disable proximity detection. The UTRAN 110 may also invalidate or delete the proximity indication configuration information previously used to configure the UE.

Figure 3D:
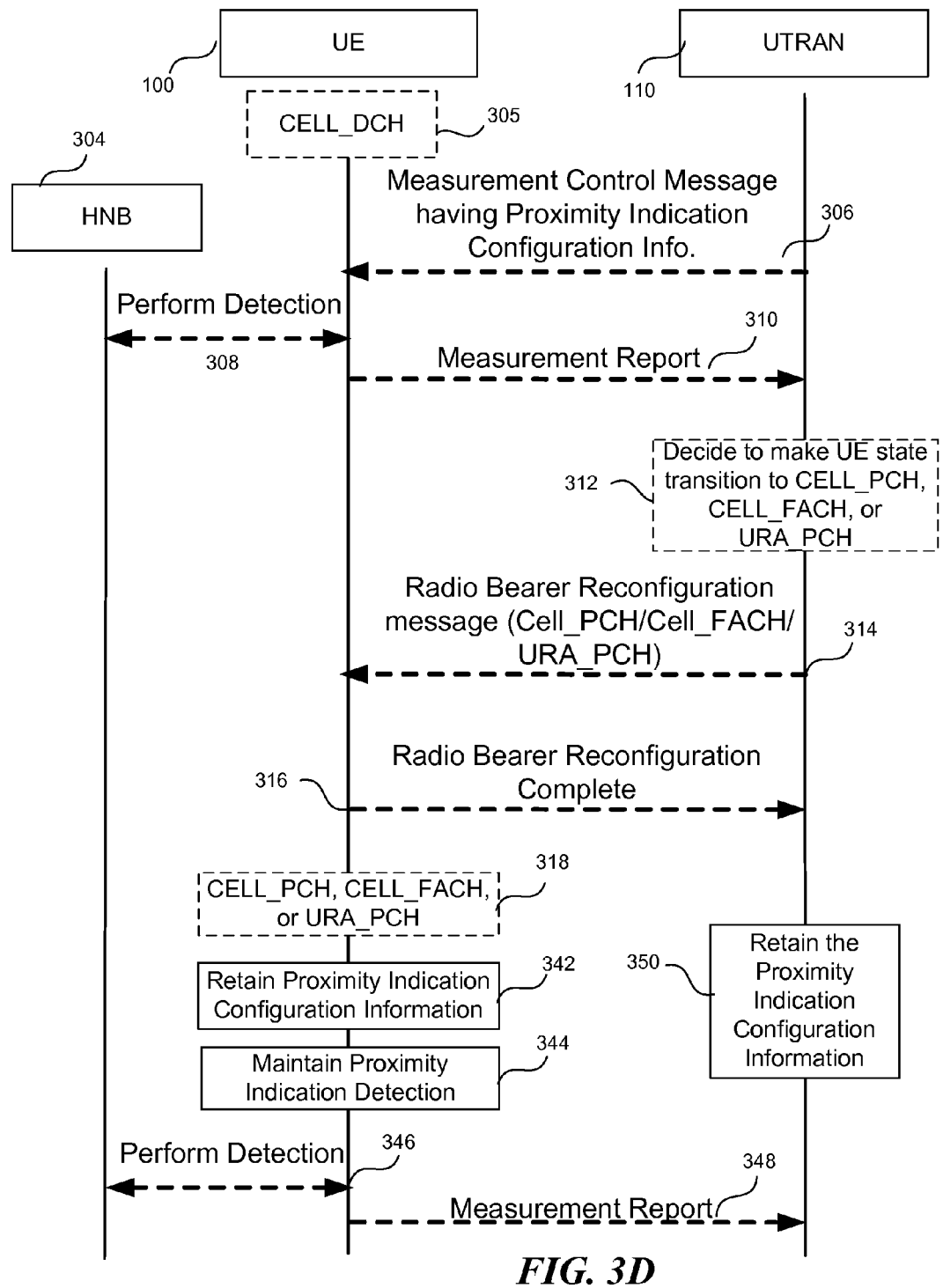
FIG. 3D is a timing diagram of an example communication between a UTRAN and a UE where proximity indication reporting is retained when the UE transitions from using CELL_FACH, CELL_PCH, or URA_PCH to CELL_DCH.

FIG. 3D is a timing diagram of an example communication between a UTRAN and a UE where proximity indication reporting is retained when the UE transitions from CELL_DCH to CELL_FACH, CELL_PCH, or URA_PCH. Steps 305-318 are similar to steps 305-318 of FIG. 3A. However, upon transitioning from CELL_DCH to the new state at step 318, the UE 100 retains the proximity indication configuration information at step 342 that was configured in step 306. Additionally, the UE may maintain its ability to detect proximity indication at step 344 by performing detection at step 346 on one or more HNBs 304 and reporting the measurements to the UTRAN 110 at step 348. The UTRAN 110 may also retain the proximity indication configuration information 350 previously used to configure the UE 100 at step 306.

In some cases, the UE 100 may respond to the radio bearer reconfiguration message received at step 314 of FIGS. 3A-3D by transitioning to a state different from the state indicated by the message at step 314. In these cases, the UE may invalidate or delete the proximity detection configuration information delivered in step 306. For example, if the radio bearer reconfiguration message at step 314 contains information to configure the UE 100 to use cell state CELL_FACH, but the UE 100 selects cell state CELL_PCH, CELL_DCH, or URA_PCH, the UE 100 may delete or invalidate the proximity detection configuration information at the UE 100.

Similarly, in another implementation of the embodiments described in FIGS. 3A-3D, if the UE 100 transitions to a new state at step 318 due to the radio bearer reconfiguration message at step 314, and the message does not indicate a cell state to which to transition, the UE 100 may invalidate or delete its proximity configuration information.

In another embodiment (not shown), when the UE 100 transitions from CELL_FACH to CELL_PCH or URA_PCH, the UE 100 retains the proximity indication configuration information. Additionally, the UE may maintain its ability to detect proximity indication by performing measurements on one or more HNBs 304 and reporting the measurements to the UTRAN 110. The UTRAN 110 may also retain the proximity indication configuration information 350 previously used to configure the UE 100. If the UE 100 transitions to CELL_PCH or URA_PCH due to the radio bearer reconfiguration message and the message does not indicate a cell state to which to transition, the UE 100 may invalidate or delete its proximity configuration information.

In yet another implementation of the embodiments described in FIGS. 3A-3D, if the UE 100 transitions to a new state at step 318 not due to the radio bearer reconfiguration message at step 314, the UE 100 may invalidate or delete the proximity configuration information at the UE 100. For example, if the UE 100 cannot detect the UTRAN 110 due to a radio link failure, the UE 100 may perform a transition from one cell state to another. In this case, the UE may invalidate or delete its previously configured proximity indication.

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any module with one or more processors, etc.). For example, a machine-accessible medium includes recordable/nonrecordable media (e.g., read-only memory (ROM), random access memory (RAM), magnetic disk storage media, optical storage media, flash memory devices, etc.).

The term "logic," as used herein, can include, for example, special-purpose hardwired circuitry, software, and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

I claim:

1. A method of configuring proximity detection in a user equipment (UE) transitioning from one radio resource control (RRC) cell state to a different RRC cell state within a wireless communication system, the method comprising:
   receiving proximity detection configuration information from a network of the wireless communication system to configure proximity detection in the UE;
   configuring the proximity detection in the UE based on the proximity detection configuration information,
   wherein the proximity detection configuration information enables the UE to perform the proximity detection and proximity indication reporting;

receiving a radio bearer reconfiguration message as part of a procedure to configure the UE from using a first RRC cell state complying with a third generation (3G) wireless specification to using a second RRC cell state complying with the 3G wireless specification,
  wherein the second RRC cell state is different from the first RRC cell state, and
  wherein the wireless communication system is a universal mobile telecommunications system (UMTS) complying with the 3G wireless specification,
in response to the radio bearer reconfiguration message, reconfiguring the proximity indication reporting in the UE based on the first RRC cell state or the second RRC cell state; and
invalidating or deleting the received proximity detection configuration information when the UE transitions to a RRC cell state different from the second RRC cell state indicated by the radio bearer reconfiguration message.

2. The method of claim 1, wherein the first RRC cell state is CELL_DCH, and wherein the second RRC cell state is selected from a group consisting of CELL_FACH, CELL_PCH, and URA_PCH.

3. The method of claim 2, wherein reconfiguring the proximity indication reporting in the UE further comprises:
  stopping performing the proximity indication reporting in the UE.

4. The method of claim 1, wherein the network from which the UE receives the proximity detection configuration information is a UMTS terrestrial radio access network (UTRAN).

5. The method of claim 2, wherein reconfiguring the proximity indication reporting in the UE comprises invalidating or deleting the proximity detection configuration in the UE and stopping performing the proximity detection in the UE.

6. The method of claim 2, wherein reconfiguring the proximity indication reporting in the UE comprises retaining the proximity detection configuration and performing the proximity detection based on the proximity detection configuration.

7. The method of claim 1, wherein when the first RRC cell state is CELL_DCH, the second RRC cell state is CELL_FACH, and the UE is configured for high speed downlink shared channel (HS-DSCH) discontinuous (DRX) reception in CELL_FACH or CELL_FACH measurement occasion information, reconfiguring the proximity indication reporting in the UE comprises allowing the UE to perform proximity indication reporting after the transition of the UE from CELL_DCH to CELL_FACH.

8. The method of claim 2, wherein reconfiguring proximity indication reporting in the UE comprises stopping performing the proximity detection in the UE.

9. The method of claim 8, further comprising resuming performing the proximity detection in the UE after a transition of the UE to CELL_DCH.

10. The method of claim 3, further comprising resuming the UE to perform proximity indication reporting after a transition of the UE to CELL_DCH.

11. A method of configuring proximity detection in a user equipment (UE) transitioning from one radio resource control (RRC) cell state to a different RRC cell state within a wireless communication system, the method comprising:
  receiving proximity detection configuration information from a network of the wireless communication system to configure proximity detection in the UE;
  configuring the proximity detection in the UE based on the proximity detection configuration information,
    wherein the proximity detection configuration information enables the UE to perform the proximity detection and proximity indication reporting;
  receiving a radio bearer reconfiguration message as part of a procedure to configure the UE from using a first RRC cell state complying with a third generation (3G) wireless specification to using a second RRC cell state complying with the 3G wireless specification,
    wherein the second RRC cell state is different from the first RRC cell state, and
    wherein the wireless communication system is a universal mobile telecommunications system (UMTS) complying with the 3G wireless specification,
  in response to the radio bearer reconfiguration message, stopping performing the proximity indication reporting in the UE and stopping performing the proximity detection in the UE based on a transition from the first RRC cell state to the second RRC cell state.

12. The method of claim 11, wherein the first RRC cell state is CELL_DCH, and wherein the second RRC cell state is selected from a group consisting of CELL_FACH, CELL_PCH, and URA_PCH.

13. The method of claim 11, wherein the network, from which the UE receives the proximity detection configuration information, is a UMTS terrestrial radio access network (UTRAN).

14. A method of configuring proximity detection in a user equipment (UE) transitioning from one radio resource control (RRC) cell state to a different RRC cell state within a wireless communication system, the method comprising:
  receiving proximity detection configuration information from a network of the wireless communication system to configure proximity detection in the UE;
  configuring the proximity detection in the UE based on the proximity detection configuration information,
    wherein the proximity detection configuration information enables the UE to perform the proximity detection and proximity indication reporting;
  receiving a radio bearer reconfiguration message as part of a procedure to configure the UE from using a first RRC cell state complying with a third generation (3G) wireless specification to using a second RRC cell state complying with the 3G wireless specification,
    wherein the second RRC cell state is different from the first RRC cell state, and
    wherein the wireless communication system is a universal mobile telecommunications system (UMTS) complying with the 3G wireless specification,
  in response to the radio bearer reconfiguration message, the UE:
    stopping performing the proximity indication reporting in the UE based on a transition from the first RRC cell state to the second RRC cell state; and
    retaining the proximity detection configuration and performing the proximity detection based on the proximity detection configuration.

15. The method of claim 14, wherein the first RRC cell state is CELL_DCH, and wherein the second RRC cell state is selected from a group consisting of CELL_FACH, CELL_PCH, and URA_PCH.

* * * * *